United States Patent [19]

Bishop

[11] Patent Number: 5,415,346

[45] Date of Patent: May 16, 1995

[54] APPARATUS AND METHOD FOR REDUCING OVERSHOOT IN RESPONSE TO THE SETPOINT CHANGE OF AN AIR CONDITIONING SYSTEM

[75] Inventor: Richard A. Bishop, Clarksville, Tenn.

[73] Assignee: American Standard Inc., Piscataway, N.J.

[21] Appl. No.: 187,968

[22] Filed: Jan. 28, 1994

[51] Int. Cl.[6] .................................... G05D 15/00
[52] U.S. Cl. .................................... 236/78 D; 236/46 R
[58] Field of Search .................... 236/78 D, 47, 46 R; 165/12

[56] References Cited

U.S. PATENT DOCUMENTS

| | | | |
|---|---|---|---|
| 4,344,565 | 8/1982 | Kojima et al. | 236/46 |
| 4,345,714 | 8/1982 | Kojima | 236/46 |
| 4,442,972 | 4/1984 | Sahay et al. | 236/46 R |
| 4,615,380 | 10/1986 | Beckey | 165/12 |
| 4,838,483 | 6/1989 | Nurczyk et al. | 236/49 |
| 4,856,286 | 8/1989 | Sulfstede et al. | 62/89 |
| 4,884,590 | 12/1989 | Eber et al. | 137/1 |
| 4,928,494 | 5/1990 | Glamm | 62/222 |
| 5,114,070 | 5/1992 | Lilja et al. | 236/49 |
| 5,117,900 | 6/1992 | Cox | 165/53 |
| 5,240,178 | 8/1993 | Dewolf et al. | 236/78 |
| 5,270,952 | 12/1993 | Adams et al. | 236/46 R X |

Primary Examiner—William E. Wayner
Attorney, Agent, or Firm—William J. Beres; William O'Driscoll; Peter D. Ferguson

[57] ABSTRACT

A thermostat and method for controlling the overshoot and undershoot of the temperature in a zone that are caused by an air conditioning system responsive to a change in the setpoint of the thermostat is disclosed. The thermostat includes a sensor for detecting the temperature in the zone and being adapted to generate a signal representative of the temperature. A processor for controlling the air conditioning system is communicatively coupled to the sensor and receives the signal representative of the temperature of the zone therefrom. A setpoint input device for changing the setpoint of the thermostat is communicatively coupled to the processor and is adapted to provide a signal representative of the changed setpoint to the processor. The processor controls the air conditioning system in a static condition mode during normal operations and switches the air conditioning system to a full on mode responsive to a setpoint change. The processor is adapted to generate a time based target temperature curve and to compare the target temperature with the temperature in the zone at certain time intervals after the input of the setpoint change. The air conditioning system is switched by the processor from the full on mode of operation to the static condition mode of operation when the sensed temperature in the zone equals the temperature of the target temperature curve.

18 Claims, 3 Drawing Sheets

FAST ZONE RESPONSE

FAST ZONE RESPONSE

APPARATUS AND METHOD FOR REDUCING OVERSHOOT IN RESPONSE TO THE SETPOINT CHANGE OF AN AIR CONDITIONING SYSTEM

TECHNICAL FIELD

This invention relates to apparatus and methods for controlling the capacity of an air conditioning system. More particularly, it relates to a control system designed to limit the temperature overshoot or undershoot that typically occurs during a change of an air conditioning system's setpoint.

BACKGROUND OF THE INVENTION

A thermostat is a conventional device utilized to control the output of heating and cooling systems. The same basic thermostat may be used to control a variety of different designs of heating and cooling systems. The thermostat is typically part of a control loop that is used to match the current capacity operating of the heating and refrigeration system to the heating or cooling load presented by the zone being heated or cooled. As used herein, the term air conditioning system will refer to both heating and cooling systems.

Typically, a sensor is located within the zone being air conditioned. The sensor senses the temperature of the zone and provides a signal representative of the sensed temperature to the thermostat. In the past, the sensor was frequently incorporated within the body of the thermostat. More recently, the sensor has been used as a zone sensor providing a signal to a thermostatic controller remote from the zone under control. For purposes of this application, both shall be referred to as a thermostat.

The thermostat additionally is in receipt of an external command known as a setpoint. The setpoint is the temperature desired to be maintained within the space. The setpoint is set manually by the user adjusting the temperature dial on the thermostat. Alternatively, many thermostats currently available incorporate a microprocessor that has the capability to automatically change the setpoint on the occurrence of some event. In the heating season, the setpoint is usually automatically changed with the time of day to have a lower setpoint at night and a more elevated setpoint during the day. The opposite may be the case during the cooling season.

The thermostat compares the temperature information received from the sensor with the setpoint and generates an error signal. The error signal is provided to a control system within the air conditioning system. This control system functions to respond to the error signal by increasing or decreasing the temperature within the space. The control system may comprise valves, dampers, electric relays, and electric motor speed controllers, and may control a number of different pieces of air conditioning equipment in order to effect the temperature change that is commanded by the error signal. Such equipment may include a heat exchanging coil, fan, steam generator, or other means of heat exchange.

There are typically two modes of control of an air conditioning system, the steady state mode and the transition mode. The steady state mode controls the air conditioning system about a setpoint, which is the temperature setting of the thermostat. This setting may either be set manually by the user or it may be set in response to an automatic programmed setting selected by a microprocessor associated with the thermostat. The transition mode controls the air conditioning system when the system is in transition from one setpoint to a newly selected setpoint.

The transition mode is entered into in response to an increased or decreased setpoint. In the transition mode, the air conditioning system will turn full "on". The air conditioning system will stay full "on" until the sensor in the zone sends a signal to the thermostat indicating that the temperature in the space is equal to that of the setpoint. At that time, the air conditioning system reverts to its steady state mode of control related to the setpoint.

A problem arises during setpoint changes because the temperature sensor in the zone has a certain lag in it. Typically, the sensor is located on a wall. Air movement across the surface of a wall does not readily occur due to friction of the air with the wall. This can result in a layer of dead air immediately adjacent to the wall. Moreover, the wall may actually act as a heat sink, drawing heat from the air next to the wall and thereby affecting the temperature of the air that is being sensed by the sensor. Further, it takes a certain time for the heated or cooled air entering the volume of the zone to circulate to the wall surface in the vicinity of the thermostat. All these factors combine to create a significant lag in the time it takes for the sensor that is associated with the wall-mounted thermostat to report the actual temperature in the zone.

The sensor is accordingly always sending what amounts to a delayed temperature signal to the thermostat. The delayed temperature is representative of what the actual temperature in the zone was at some previous time. In the transition mode of operation, this results in the air conditioning system being kept on for a substantial length of time after the actual temperature in the zone exceeds the setpoint temperature. In heating systems, the resultant overshoot in temperature is undesirable because it is wasteful with respect to energy usage and it is uncomfortable for the occupants of the space. It may take up to several hours for the zone to stabilize at the setpoint temperature after an overshoot occurrence. The same phenomenon occurs during cooling of the zone when the setpoint is reduced. In this case the temperature in the zone considerably undershoots the setpoint temperature.

Such setpoint changes are common with present clock thermostats having microprocessors contained within them as temperature setpoints are sought that will maximize the energy efficiency of the air conditioning system. These thermostats can command many set up and set back cycles for energy conservation in a single day. Additionally, there are many air conditioning system installations in which the capacity of the air conditioner greatly exceeds the load needed to heat or cool the space. In these systems, making a major setpoint change causes the over capacity system to go to the full "on" condition. These systems experience serious overshoot because of the over capacity of the system. Furthermore, some systems with an automatic "unoccupied" mode allow an after hours occupant to override the unoccupied setpoint by activating a manual switch. After a period of time, the unoccupied mode will be reset automatically. Accordingly, there is a need for thermostats to efficiently control the transition from one setpoint to another with an absolute minimum of overshoot or undershoot.

A number of methods have been attempted in order to control temperature overshoot and undershoot. An example is the method put forth in U.S. Pat. No. 4,615,380. This method involves monitoring each overshoot for a period of time after an increase in the setpoint temperature has been commanded. When an overshoot that exceeds a predetermined value is detected, a gain in the system is changed in order to attempt to reduce the overshoot on the next setpoint temperature increase command. This method requires circuitry to monitor and then store data on all overshoots occurring over a period of days, as well as to set a gain based on an overshoot exceeding some predetermined value. It also appears that this system is based on the setpoint change always being the same number of degrees and is designed to function with automatically controlled thermostats.

It would be a decided advantage to be able to avoid overshoot and undershoot under all operating conditions. The means of eliminating overshoot and undershoot should be simple and inexpensive. The method should be adaptive to accommodate all changes in setpoint, not just those of a fixed number of degrees. It should effectively make use of the sensed temperature in the zone, realizing that the sensed temperature significantly lags the actual temperature in the zone.

SUMMARY OF THE INVENTION

The present invention fulfills the above stated need with the use of an internally generated, target temperature change curve. The curve is generated without reference to previous overshoot events and the only external sensor that is needed to utilize the target curve is the temperature sensor that is presently associated with the thermostat. The target curve is an exponentially derived, time related approximation of the desired temperature transition from the first setpoint to the newly selected setpoint. Because the curve is exponentially derived, the curve takes off from the first setpoint toward the second setpoint with an initial relatively steep slope. As the curve approaches the second setpoint, the slope is gradually decreased and the curve approaches the second setpoint asymptotically.

The actual temperature change in the zone responsive to the change in setpoint is a more sinusoidally shaped function over the time that it takes to meet the new setpoint. As such, the actual temperature curve starts off with a very flat slope. As time progresses, the slope of the actual temperature curve increases substantially. It is desired that the actual temperature then reduce the slope of the change and approach the setpoint temperature with a slight gradient without an overshoot. Because the target temperature curve departs from the original setpoint abruptly with a steep slope while the actual temperature starts the transition with a very shallow gradient, at a point in time after the second setpoint has been selected, the actual temperature in the space will first equal and then exceed a suitably derived target temperature curve.

The curve of measured temperature in the space roughly parallels the sinusoidal curve of the actual temperature, but is displaced in time from the actual temperature due to the lag in the sensor providing the measured temperature to the thermostat. The measured temperature will also intersect and then rise above a suitably selected target temperature curve, but at a time that is later than the time that the actual temperature intersects the target temperature curve.

Due to the above described lag, the point in time that the measured temperature equals the target temperature curve value typically occurs when the actual temperature in the space is already relatively close to the second setpoint temperature. Except under test conditions, of course, the actual temperature in the zone is not known. Only the measured temperature in the zone is known and available to control the air conditioning system. The fact that the measured temperature lags the actual temperature and that the actual temperature is very close to the new setpoint temperature when the measured temperature intersects the target temperature curve is used by the present invention to avoid overshoot conditions. At the point in time that the measured temperature intersects the target temperature curve, the air conditioning system is switched from the full "on" condition of the transition mode to the steady state control mode. This occurs when the actual temperature in the zone is close to the setpoint but has not overshot the setpoint. The steady state control mode assumes control of the air conditioning system and very gradually increases the temperature in the zone an additional amount until the temperature equals the second setpoint, thereby avoiding an overshoot condition.

During the transition from one setpoint to a second setpoint, the zone temperature rises at a rate that is a function of the particular parameters of the air conditioning system and the environment in which it is used. Accordingly, the target temperature curve derivation is responsive to these factors, in addition to being responsive to the amount of temperature differential between the first setpoint and the second setpoint.

The apparatus in accordance with the present invention includes a thermostat for controlling the overshoot and undershoot of the temperature in a zone that is caused by an air conditioning system responsive to a change in the setpoint of the thermostat. The thermostat includes a sensor for detecting the temperature in the zone that generates a signal representative of the temperature. A processor for controlling the air conditioning system is communicatively coupled to the sensor and receives the signal representative of the temperature of the zone therefrom. A setpoint input device for changing the setpoint of the thermostat is communicatively coupled to the processor and is adapted to provide a signal representative of the changed setpoint to the processor.

The processor controls the air conditioning system in a static condition mode during normal operations and switches the air conditioning system to a full on mode responsive to a setpoint change. The processor is adapted to generate a time based target temperature curve and to compare the target temperature with the temperature in the zone at certain time intervals after the input of the setpoint change. The air conditioning system is switched by the processor from the full on mode of operation to the static condition mode of operation when the sensed temperature in the zone equals the temperature of the target temperature curve.

DESCRIPTION OF THE PREFERRED EMBODIMENT

Figure 1:
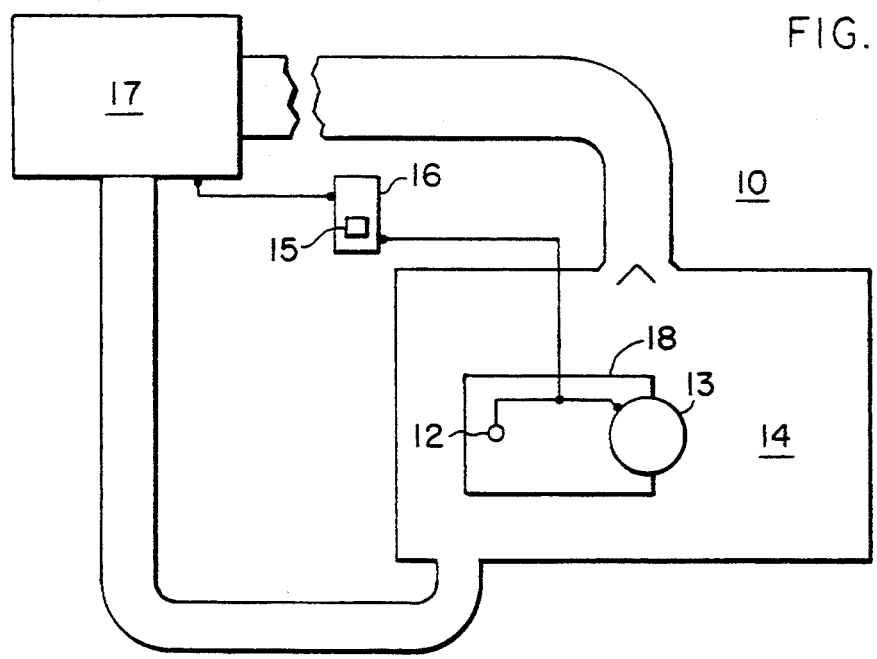
FIG. 1 is a block diagram of a typical air conditioning system control loop.

A typical air conditioning system control loop is shown generally at 10 in FIG. 1. A sensor 12 senses a controlled variable in the zone or space 14 that is being heated or cooled. In the present air conditioning system, the controlled variable is the air temperature in the zone. The sensor 12 provides a signal to a controller 16. The signal provided by the sensor 12 is representative of the measured controlled variable, which is the air temperature in the zone 14.

The controller 16 contains a processor 15 to process various inputs and to generate commands based on certain calculated curves as will be more fully explained. The processor 15 is typically a small digital computer. In many applications, the processor 15 is capable of being programmed to automatically change the setpoints of the controller 16 responsive to the time of day. Additionally, in the present invention, the processor 15 generates a target temperature curve 28 that is useful in efficiently controlling the air conditioning system.

The processor 15 compares the sensed temperature to a setpoint entered using a setpoint input device 13 such as a potentiometer, an up/down switch or switches, a keypad or the like. The setpoint is a temperature conventionally selected by the user on the setpoint input device 13 or automatically generated by the processor 15 within the controller 16. The setpoint is the temperature that is desired to be maintained in the zone 14 by the air conditioning system. The controller 16 compares the setpoint with the sensed temperature in the zone 14 and generates an error signal in the event that there is a difference between the two temperatures. The error signal is then sent in the form of a command to a control device 17. The command to the control device 17 will be to change the temperature in the zone 14 to equal the setpoint temperature.

The control device 17 may be any of a number of different devices that are utilized to change the air temperature in the zone 14. The control device 17 is an integral component of the air conditioning system. Such control devices 17 may include, for example, actuators, valves, dampers, electric relays, electric heater banks, compressors, heat pumps, fan speed controllers or electronic motor speed controllers. U.S. Pat. No. 5,117,900 to Cox; 5,114,070 to Lilja et al.; 4,838,483 to Nurczyk et al; 4,856,286 to Sulfstede et al; 4,884,590 to Eber et al. and 4,928,494 to Glamm are representative of control devices and systems to which the present invention might apply. These patents are commonly assigned with the present invention and are hereby incorporated by reference.

The control device 17 is utilized to change a manipulated variable. The manipulated variable is a heating or cooling medium produced by the air conditioning system and may be, for example, the flow of chilled or heated air, the flow of chilled or heated water, steam flow, or electricity. It is the manipulated variable that actually effects the temperature change in the zone 14. The manipulated variable used depends upon the type of air conditioning system utilized in cooling and heating the zone 14. Such air conditioning systems include, for example, forced air, all electric, and hydronic. The forced air system is likely the most common system used in modern installations. The control device 17 will affect the temperature in the zone 14 by generating a change in the particular manipulated variable that is utilized.

Completing the loop, the sensor 12 will sense the temperature change in the zone 14 and will provide a new temperature signal to the processor 15 representative of the increased or decreased temperature in the zone 14. The processor 15 will again compare the new temperature signal with the setpoint temperature and, if needed, generate a new error signal.

The sensor 12 is located in the zone 14 being monitored and is either contained within the controller 16, if the controller 16 is a thermostat located in the zone 14, or housed in its own housing 18 if an external or remote controller is in use. It is significant to note that due to the time it takes for the new temperature in the zone 14 to affect a wall mounted sensor 12, there is a distinct and undesirable lag in the sensor 12 providing the new zone temperature to the processor 15. Additionally, the location of a wall mounted sensor 12 or a portable sensor 12 may be such that external factors further retard temperature sensing. Such external factors include locating the sensor 12 in direct sunlight or in an area with obstructed or poor air circulation.

The control method of the present invention controls the air conditioning system during the transition mode of operation when the air conditioning system is transitioning from an old setpoint to a new setpoint. The method makes use of the fact that the temperature of the zone 14 as measured by the sensor 12 substantially lags the actual air temperature of the zone 14 during a change from a first setpoint to a second setpoint. This means that at any given point in time after the change in the setpoint has been made and before the temperature in the zone 14 has attained the temperature of the second setpoint, the actual zone 14 air temperature will be substantially closer to the new setpoint temperature than the measured zone 14 temperature. This lag is due to physical inefficiencies in sensing due primarily to the fact that the controller 16 is mounted on or in a wall of the zone 14 that is being air conditioned and, to a lesser degree, by mechanical delay induced by the types of sensors utilized for the sensor 12. Since the measured zone 14 temperature is the only temperature that is sensed by the sensor 12, the present invention utilizes the sensed temperature to control the device 17 in a manner such that overshoot or undershoot of the newly selected temperature setpoint is minimized or eliminated.

Figure 2:
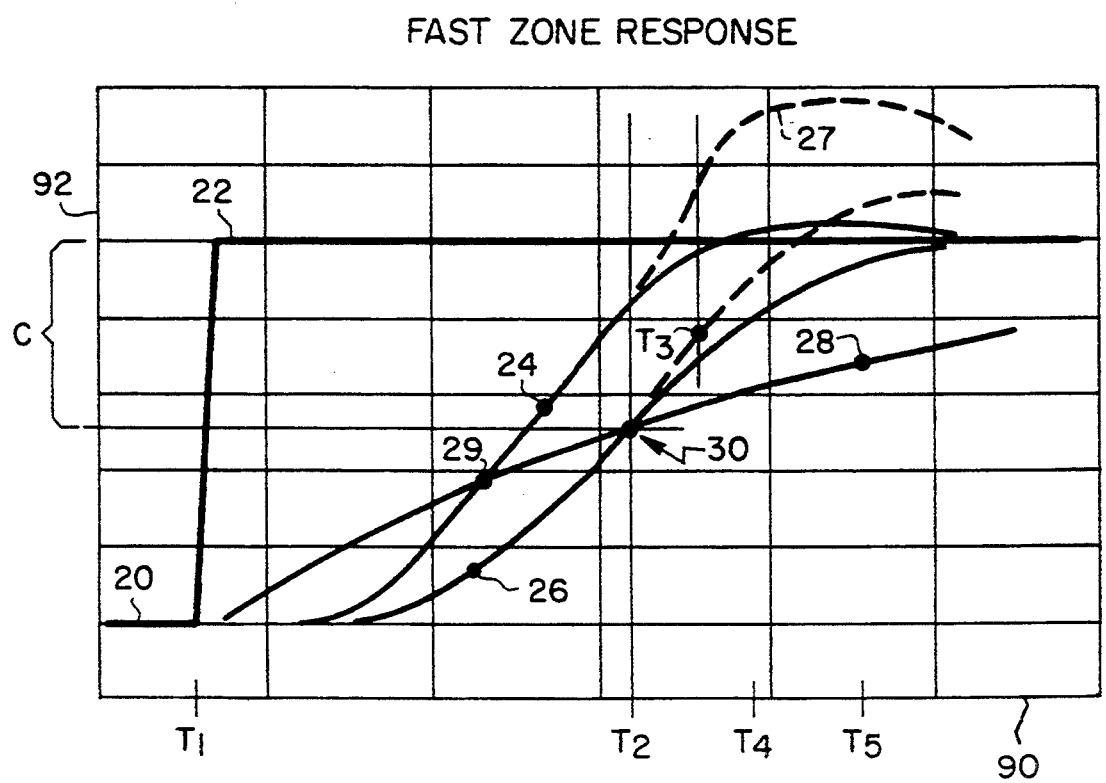
FIG. 2 is a graph of temperature as a function of time showing a fast response condition.
Figure 3:
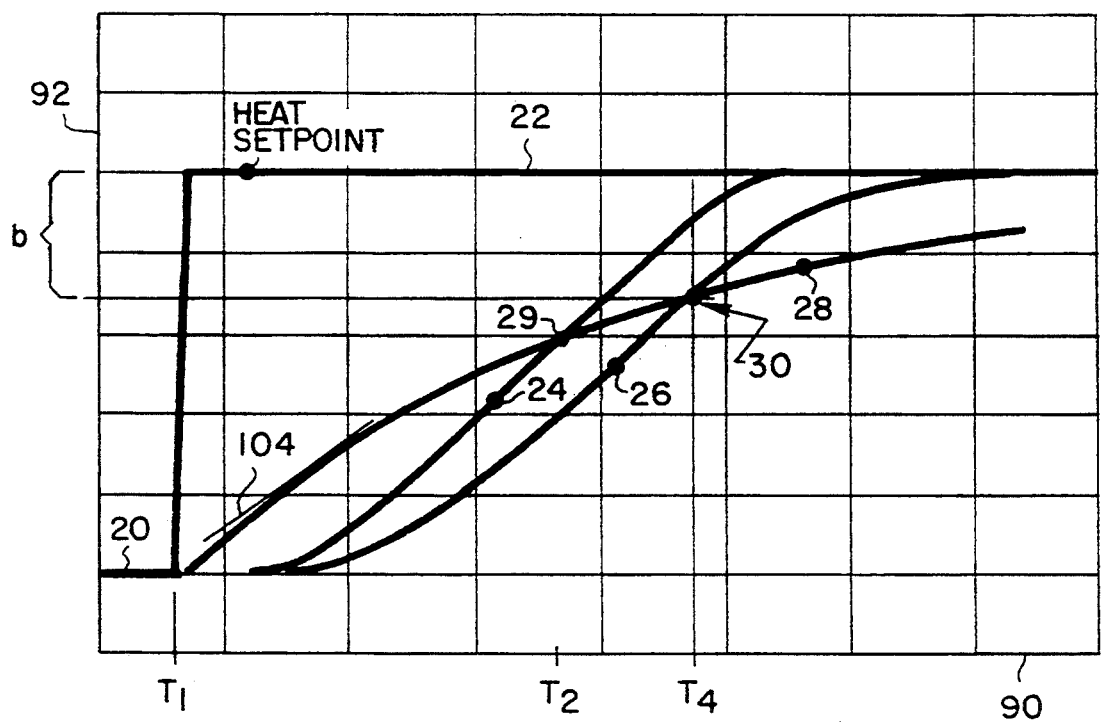
FIG. 3 is a graph of temperature as a function of time showing a medium response condition.
Figure 4:
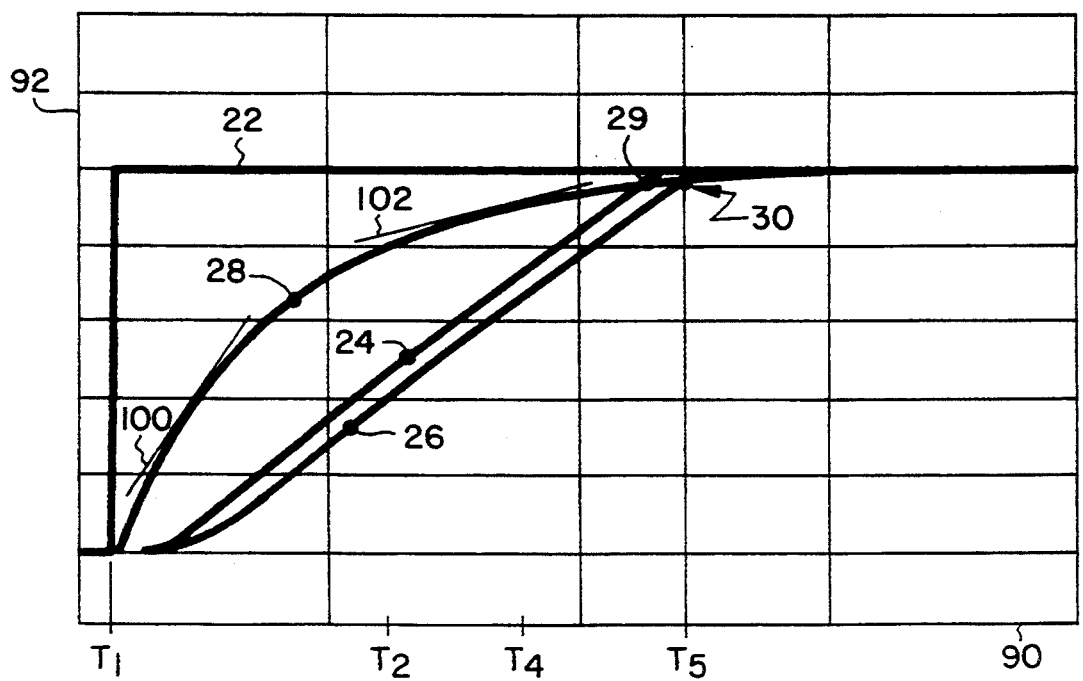
FIG. 4 is a graph of temperature as a function of time showing a slow response condition.

FIGS. 2, 3, and 4 depict graphs of time along an ordinate 90 with respect to the temperature along an abscissa 92. In FIGS. 2, 3, and 4 like numbers are used to indicate like points and parameters.

FIG. 2 depicts the response of the control device 17 operating in a relatively fast changing zone. A first or old setpoint is indicated at 20. Prior to a time T1, the air conditioning system is functioning in the steady state control mode as indicated in FIG. 2 and is maintaining the temperature in the zone 14 at the first setpoint 20 plus or minus the differential temperature, as the case may be. At the time T1, a second or new setpoint 22 is commanded by the user or automatically by the controller 16. This second setpoint 22 is, in the example, an increased temperature.

At time T1, the air conditioning system enters the transition mode of operation and is commanded to the full "on" transition mode of operation for a predetermined time period. The temperature in the zone 14 will rise as indicated by an actual temperature curve 24. A change in temperature, as indicated by actual temperature curve 24, starts slowly and builds to an increased rate of change between the old setpoint 20 and the new setpoint 22. The measured temperature, as measured by the sensor 12, is indicated by a measured temperature curve 26 to lag the actual temperature curve 24. The measured temperature curve 26 typically closely parallels the actual temperature curve 24 in form, but is displaced in time from the actual temperature curve 24. This displacement of time is a result of the lag in the sensor 12 in accurately measuring the temperature in zone 14 and providing data representative of that temperature to the processor 15.

As the actual temperature curve 24 approaches the new setpoint 22, the rate of change of temperature decreases commencing at a transition time T2. After the transition time T2, the actual temperature curve 24 gradually approaches and equals the new setpoint 22 without the occurrence of an overshoot or an undershoot. However, if the transition time T2 is not implemented in accordance with the present invention and if a late transition occurs in a fast zone, the controller 16 will not see a zero error between the temperature measured 26 by the sensor 12 and the setpoint 22 until a time T3. Since the time T3 is subsequent to the time T2, by the time T3 is reached, the actual temperature 24 in the zone 14 will have substantially overshot the new setpoint 22 and will continue to overshoot as indicated by the dashed line 27.

The present invention generates an exponentially decaying target temperature curve 28 the mechanics of which are subsequently discussed. The target temperature curve 28 is developed in the processor 15 contained within the controller 16. The target temperature curve 28 is responsive to the rate of temperature increase over time that can be generated by the air conditioning system in the zone 14. This rate is predetermined by the system designer and stored in the processor 15 as either a constant or as a formula using information available to the processor 15. This rate is a function of the air volume of the zone 14, the capacity of the air conditioning system in the full "on" condition, and of other operating parameters of the air conditioning system that define the actual output capacity of the air conditioning system that affect the amount of heat or cold that the air conditioning system is able to generate or absorb relative to the zone 14 in a particular period of time. Such operating parameters as are indicated above include, for example, the duct system and registers in the zone 14 that actually deliver the air to the zone 14. The efficiency of the design of such components, the length of run between the air conditioning unit and the zone 14, and the amount in internal friction and back pressure generated in the ducts affect the overall capacity of the air conditioning system to heat or cool the zone 14. This affects the rate at which the air conditioning system is able to heat or cool the zone 14 responsive to a setpoint change.

The target temperature curve 28 also is a function of the temperature difference between the old setpoint 20 and the new setpoint 22. The setpoint difference is a variable that is usually set by the user by altering the setpoint input device 13 to enter the new setpoint 22. In some circumstances such as a transition from the night setting to the day setting, the difference may be eight degrees or more. In other instances the change may simply be to accommodate a preference for a slightly higher or lower temperature setting for the particular occupants of the zone and may be as little as two degrees. The curvature of the target temperature curve 28 accommodates the varying differences in the setpoint change.

As a result of the exponential derivation of the target temperature curve 28, the target temperature curve 28 initially has a steep slope 100 and rises quickly from the old setpoint 20. This quick rise initially positions the target temperature curve 28 above both the measured temperature curve 26 and the actual temperature curve 24. As time progresses, the slope 102 of the target temperature curve 28 decreases in order to approach the new setpoint 22 at a very shallow angle, i.e. the new setpoint 22 acts as a limit for the target temperature curve 28. As a result of the flattening of the target temperature curve 28, the actual temperature curve 24 will ultimately intersect the target temperature curve 28 at a point 29. Due to the lag of the sensor 12, the measured temperature curve 26 intersects the target temperature curve 28 sometime later than the actual temperature curve 24. The intersection of the measured temperature curve 26 with the target temperature curve 28 occurs at the transition time T2 and is shown as a point 30 in FIG. 2. In the present invention, the shift from the transition mode of operation to the steady state mode of operation after turning off the heating or cooling occurs at the transition time T2 as indicated by the point 30.

FIG. 3 depicts the response of the control device 17 operating in a moderately changing zone. Thus, the intersection of the target temperature curve 28 and the measured temperature curve 26 occurs at the point 30 in a manner similar to FIG. 2 but at a later transition time T4 because the temperature is changing more slowly. Due to the more gradual arc of the target temperature curve 28, selected because of the medium speed response of the controlled variable 17, the point 30 is a smaller distance B from the new setpoint 22 in FIG. 3 than the greater distance C shown with regard to the faster responding zone of FIG. 2.

FIG. 4 depicts the response of the control device 17 operating in a relatively slow moving zone such that the change in operating modes from the transition mode to the steady state mode occurs at an even later transition time T5. The point 30 is at a greater distance A from the new setpoint 22 than either the distance B of FIG. 3 or the distance C of FIG. 2. Effectively, this means that the transition time T2 is much smaller for the fast response zone of FIG. 2 with regard to the transition time T4 of the medium response zone of FIG. 3 and the transition time T5 of the slow response zone of FIG. 4. Conversely, the transition time T5 is much slower for the slow response zone of FIG. 4 with regard to the transition time T4 of the medium response zone of FIG. 3 and the transition time T2 of the fast response zone of FIG. 2.

The target temperature curve 28 is calculated continuously according to the following equation:

$$\text{Target Temperature} = \text{New Setpoint} - [(\text{New Setpoint} - \text{Old Setpoint})e^{-T/t}]$$

This continuous solution is approximated in the processor 15 using the following finite difference equation:

$$\text{Target}(i) = K[\text{New Setpoint} + (1-K)][\text{Target}(i-1)]$$

where:
- i is a sequential sample number, with i=zero being the first sample at the Old Setpoint;
- K=T/t;
- T is the length of a sampling period. This is a fixed number in the equation, and has been chosen to be a period of ten seconds but clearly can be varied to represent other time lengths or irregular intervals; and
- t is a exponential time constant. The value of the time constant t in the above equation is the most critical parameter. The time constant t is related to the relative rate of speed of zone temperature change in the particular application while actively heating or cooling in the full "on" transitional condition. In a preferred embodiment, the value has been empirically chosen to be 300 seconds but can and will vary in other systems.

Figure 5:
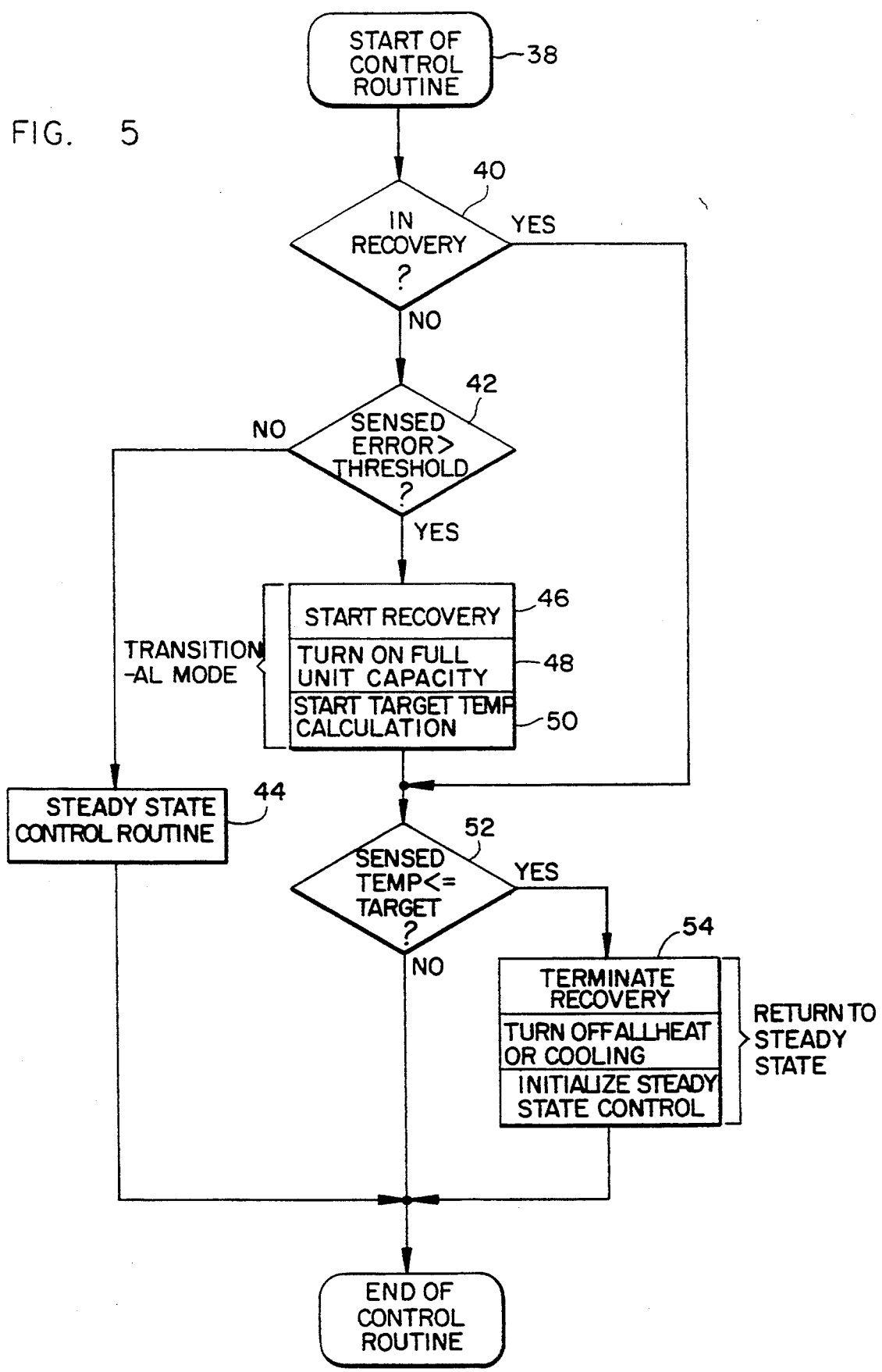
FIG. 5 is a flow diagram depicting the method of the present invention.

The operation of the present invention is best understood with reference to FIG. 5. The routine is embodied in the processor 15 and is entered at the initial conditions of step 38 which provides the setpoint temperature input 13 and the sensed temperature input, respectively, to the controller 16. The controller 16 compares the setpoint temperature and the sensed temperature 26.

At step 40, the controller 16 determines if the process of transitioning from an old setpoint 20 to a new setpoint 22 is already underway. If the controller 16 is in recovery, step 52 is implemented. Otherwise, step 42 is next.

At step 42, the program asks whether the sensed error between the temperature setpoint and the sensed temperature is greater than a predetermined threshold temperature (2° F. in the preferred embodiment).

If the answer to the question at step 42 is "no", the processor 15 sets control of the air conditioning system to the steady state control mode shown at step 44. The threshold temperature may, for example, be a plus or minus two degree variation from the setpoint temperature. The temperature threshold is a fixed value that is a set as an initial condition in step 38. In the instance that the sensed temperature of the zone 14 as sensed by the sensor 12 and provided to the processor 15 differs from the setpoint temperature by the amount of the threshold temperature or more, the air conditioning system is turned on. If the difference between the setpoint and the sensed temperature is negative, cooling is commanded, else heating is commanded. When the sensed temperature in the zone 14 is less than the threshold temperature in variance from the setpoint temperature 18, the air conditioning system is turned off.

In the event of a setpoint change, the difference between the setpoint temperature and the sensed temperature from the zone 14 at step 42 will exceed the predetermined threshold temperature. In this instance, the processor 15 commands the air conditioning system to the transitional control mode indicated at step 46.

In the transitional control mode, the air conditioning system is always full "on" as indicated at step 48. As noted above, heating is commanded if the sensed temperature is less than the setpoint, while cooling is commanded if the sensed temperature 26 is greater than the setpoint. Transitional control starts at time T1 in FIGS. 2 through 4. When transitional control begins, the target temperature curve 28 is generated as indicated at step 50.

With the target temperature curve 28 available, step 52 asks whether the measured temperature 26 in the zone 14 is as close as or closer to the new setpoint 22 than the target temperature 28 is. If the answer is "yes" because the measured temperature curve 26 has crossed the target temperature curve 28, steady state control is commanded as indicated at step 54. This occurs at the point 30 in FIGS. 2 through 4. By this cycling, the steady state control mode takes control of the air conditioning system to gradually bring the temperature in the zone to the new setpoint temperature and thus avoids an overshoot or an undershoot condition.

In the instance that the test performed at step 52 indicates that the sensed temperature curve 26 in the zone is not as close as or closer to the new setpoint 22 than the target temperature curve 28 is since that measured temperature curve 26 has not yet crossed the target temperature curve 28, the air conditioning system is left on in the transitional control mode.

The routine as previously described is repeated at frequent intervals after time T1. In this manner, effective control of the air conditioning system is maintained in both the steady state control mode and the transitional control mode. Transitions are made from the transitional mode to the steady state mode when the actual temperature in the zone is approaching the new setpoint temperature, and overshoots and undershoots are prevented through use of the target temperature curve 28 as provided for in step 50.

The point of intersection 30 of the measured temperature 26 and the target temperature 28 has been shown to be an excellent tool to control the overshoots caused by a severely over-capacity air conditioning system. It is important to realize that this is a simple method of utilizing the only sensed temperature data available on which to signal a transit from the air conditioning system being full "on" in the transition mode of control to the steady state control mode. Absent the present invention, the measured temperature 26 that is available to processor 15 is simply not a reliable criteria upon which to base the control mode transition. The generation of an exponential target temperature curve 28 provides a reliable parameter that is indicative of the fact that the actual temperature 24 in zone 14, which is sensed only in test conditions, is approaching the setpoint 22 when the target temperature 28 equals the measured temperature 26.

While the above description has been oriented to a setpoint increase and increased heating in the zone causing a temperature overshoot, the present invention is equally applicable to control an undershoot resulting from the second setpoint being a lower temperature than the first setpoint. In this case the undershoot is caused by increased cooling in the zone.

Although a certain specific method of the present invention has been shown and described, it is obvious that many modification and variations thereof are possible in light of these teachings. Specifically, the various potential target temperature curves are contemplated to fall within the spirit and scope of the present invention. It is to be understood, therefore, within the scope of the appended claims, the invention may be practiced otherwise specifically described herein.

What is claimed is:

1. An improved thermostat for controlling the overshoot and undershoot of the temperature of the air in a zone serviced by an air conditioning system that occurs responsive to a change in the setpoint of the thermostat requiring operation of the air conditioning system, comprising:

sensor means for detecting the temperature in the zone and being adapted to generate a temperature signal representative of the temperature;

processor means operably coupled to the air conditioning system and the sensor means for receiving the temperature signal representative of the temperature of the zone from the sensor means and controlling the operation of the air conditioning system responsive to the temperature signal;

setpoint input means operably coupled to the processor means for setting the setpoint of the thermostat, said setpoint input means including means for providing a setpoint signal representative of the setpoint to the processor means, the processor means controlling the air conditioning system in a steady state condition mode of operation during normal air conditioning system capacity control operations and switching the air conditioning system to a full on transition mode of operation responsive to a setpoint change requiring operation of the air conditioning system, the processor means being adapted for generating a time based target temperature curve and comparing the target temperature from the target temperature curve to the temperature signal provided by the sensor means at predetermined time intervals after the input of the setpoint change and switching the air conditioning system from the full on transition mode of operation to the steady state condition mode of operation when the sensed temperature in the zone equals the temperature of the target temperature curve.

2. A method for controlling the output of an air conditioning system conditioning the air in a zone, the control of the output being exercised through a thermostat having a temperature setpoint, the improvement controlling overshoot and undershoot of the temperature in a zone that occur responsive to a change in the setpoint of the thermostat, the improved method including the steps of:

detecting the temperature in the zone and generating a temperature signal representative of the temperature;

changing the setpoint of the thermostat and generating a setpoint signal representative of the changed setpoint;

controlling the air conditioning system in a steady state condition mode during normal air conditioning system capacity control operations and switching the air conditioning system to a full on transition mode of operation responsive to a setpoint change requiring operation of the air conditioning system, generating a time based target temperature curve and comparing the target temperature from the target temperature curve to the temperature sensed in the zone by the sensor means at certain time intervals after the input of the setpoint change; and switching the air conditioning system from the full on transition mode of operation to the steady state condition mode of operation when the sensed temperature in the zone equals the temperature of the target temperature curve.

3. A method for controlling the output of an air conditioning system to minimize the overshoot and undershoot of the temperature in a zone caused by a change in the setpoint of the air conditioning system, the method including the steps of:

generating a signal representative of the temperature in the zone;

generating a signal changing the setpoint of the air conditioning system;

generating a time function responsive to changing the setpoint of the air conditioning system;

developing a time based target temperature curve that is initiated at the time of changing the setpoint of the air conditioning system;

comparing the signal representative of the temperature in the zone to the temperature of the target temperature curve at selected time intervals; and controlling the output of the air conditioning system as a function of the time at which the signal representative of the temperature in the zone equals the temperature of the target temperature curve.

4. Apparatus for controlling the capacity of an air conditioning system to minimize the overshoot and undershoot of the temperature in a zone caused by a change in the setpoint of the air conditioning system, comprising:

sensor means for generating a signal representative of the temperature in the zone;

setpoint input means for generating a signal changing the setpoint of the air conditioning system;

timing means for generating a time function responsive to changing the setpoint of the air conditioning system;

processor means communicatively coupled to the sensor means and the setpoint input means and receiving said signals therefrom, adapted for developing a time based target temperature curve that is initiated at the time of changing the setpoint of the air conditioning system and being adapted to control the capacity of the air conditioning system as a function of the time at which the signal representative of the temperature in the zone equals the temperature of the target temperature curve.

5. Apparatus for controlling the output of an air conditioning system that conditions the air in a zone in response to a setpoint change, the apparatus having a temperature sensor that senses the temperature in the zone, a setpoint input device for selectively setting the setpoint and a processor that receives a signal input from the sensor representative of the temperature in the zone and receives a temperature setpoint signal representative of the temperature desired to be maintained in the zone from the setpoint input device and that compares the zone temperature and the setpoint temperature to generate an output signal comprising an operating command to the air conditioning system to effect the desired temperature in the zone, the apparatus including:

the processor being adapted for generating a time-based target temperature curve at the time of the setpoint change and comparing the received zone temperature signal from the sensor to the target temperature at selected time intervals after the setpoint change, and controlling the output of the air conditioning system as a function of the occurrence of the received zone temperature signal equalling the temperature of the target temperature curve.

6. Apparatus adapted to control an air conditioning system in transition from a first temperature setpoint to a second temperature setpoint requiring operation of the air conditioning system, the air conditioning system having a steady state mode of control to control air temperature in a zone serviced by the air conditioning system at a setpoint and a transition mode of control to control air temperature in the zone responsive to a change of setpoint from the first setpoint to the second setpoint, including sensor means for providing a sensed air temperature representative of the air temperature in said zone and actuation means operably coupled to said sensor means for switching the air conditioning system from the transition mode of control to the steady state mode of control as a function of said sensed temperature and a predetermined rate of temperature increase over time, wherein the control apparatus switches the air conditioning system from the transition mode of control to the steady state mode of control at a point in the transition prior to the sensed temperature in the zone equaling the temperature of the second setpoint.

7. Apparatus as claimed in claim 6 including a processor adapted to receive a signal representative of the sensed temperature in the zone, generating a target temperature curve, comparing the sensed temperature signal to the target temperature curve and switching the air conditioning system from the transition mode of control to the steady state mode of control as a function of the sensed temperature in relation to the target temperature curve.

8. Apparatus as claimed in claim 7 wherein the target temperature curve is an exponentially derived function that is responsive to that rate of change of the temperature in the zone which the air conditioning system is capable of producing when the air conditioning system is in the transition mode of operation and to the temperature difference between the first temperature setpoint and the second temperature setpoint.

9. A method for controlling the output of an air conditioning system to minimize the overshoot and undershoot of the temperature in a zone resulting from a transition from a first temperature setpoint to a second temperature setpoint, the method including the steps of:
 sensing the temperature in the zone;
 generating a target temperature curve as a function of (1) the rate of temperature change that the air conditioning system is able to effect in the zone during the transition from the first temperature setpoint to the second temperature setpoint and (2) the temperature differential between the first temperature setpoint and the second temperature setpoint;
 periodically comparing the sensed temperature in the zone to the target temperature curve; and
 altering the output of the air conditioning system responsive to the occurrence of the sensed temperature being at a selected temperature relative to the target temperature curve.

10. The method for controlling the output of an air conditioning system as claimed in claim 9 wherein the target temperature curve is an exponentially derived function.

11. The method for controlling the output of an air conditioning system as claimed in claim 9 wherein the target temperature curve has a relatively steep slope after departure from the first temperature setpoint, gradually decreasing in slope with time to asymptotically approach the second temperature setpoint.

12. The method for controlling the output of an air conditioning system as claimed in claim 9 wherein the output of the air conditioning system is altered at the time that the sensed temperature in the zone equals the temperature of the target temperature curve.

13. A method for controlling the output of an air conditioning system to minimize the overshoot and undershoot of the temperature in a zone during the transition from a first temperature setpoint to a second temperature setpoint, the air conditioning system being adapted to function in a steady state mode of control about a temperature setpoint and in a transition mode of control when in transition from a first temperature setpoint to a second temperature setpoint, the method comprising the steps of:
 sensing the temperature in the zone during the transition from the first temperature setpoint to the second temperature setpoint;
 generating a target temperature curve;
 switching the air conditioning system from the transition mode of operation to the steady state mode of operation utilizing the relation of the sensed temperature in the zone to the target temperature curve to predict when the actual temperature in the zone was proximate the second temperature setpoint.

14. The method for controlling the output of an air conditioning system as claimed in claim 13 wherein the target temperature curve is an exponentially derived function.

15. The method for controlling the output of an air conditioning system as claimed in claim 13 wherein the target temperature curve has a relatively steep slope after departure from the first temperature setpoint, gradually decreasing in slope with time to asymptotically approach the second temperature setpoint.

16. The method for controlling the output of an air conditioning system as claimed in claim 13 wherein the mode of control of the air conditioning system is a switched at the time that the sensed temperature in the zone equals the temperature of the target temperature curve.

17. A method of minimizing overshoot or undershoot while changing a setpoint in an HVAC system having a steady state mode of operation and a transitional mode of operation, comprising the steps of:
 operating the HVAC system in the steady state control mode of operation responsive to an old setpoint so as to maintain a condition in a zone;
 monitoring the condition in the zone;
 accepting a new setpoint;
 generating a target condition curve as a function of the old setpoint and the new setpoint;
 operating the HVAC system in the transitional mode of operation;
 periodically comparing the monitored condition to the target condition curve;
 continuing to operate in the transitional mode of operation if the monitored condition is farther from the new setpoint than the target condition curve; and
 returning to the steady state mode of operation if the target condition curve is the same as the monitored condition or farther from the new setpoint than the monitored condition.

18. The method of claim 17 wherein the monitored condition is temperature and the target condition curve is an exponential function.

* * * * *